July 3, 1945. M. L. ZEILSTRA 2,379,777
WELDING ELECTRODE HOLDER
Filed Oct. 12, 1943 3 Sheets-Sheet 3
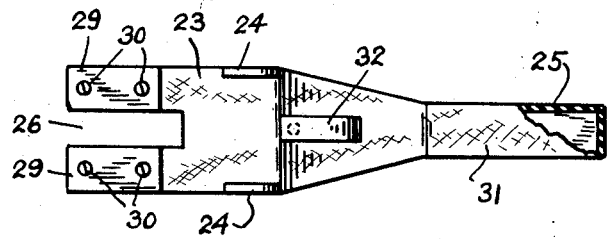
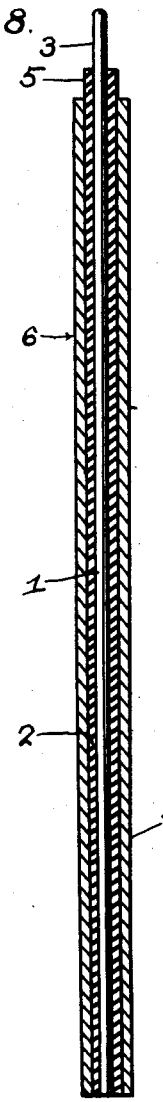
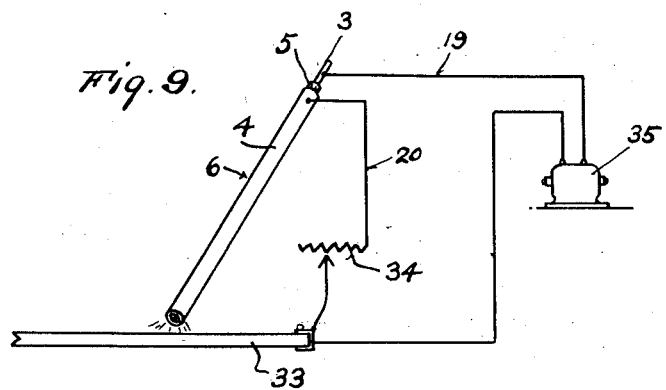
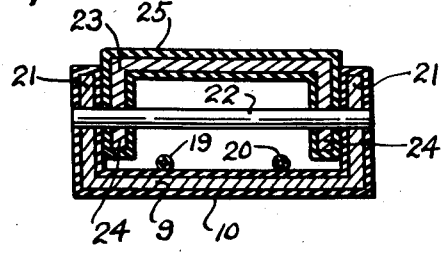
Inventor
MAURICE L. ZEILSTRA
By Clarence A. O'Brien
and Harvey B. Jacobson
Attorneys Patented July 3, 1945

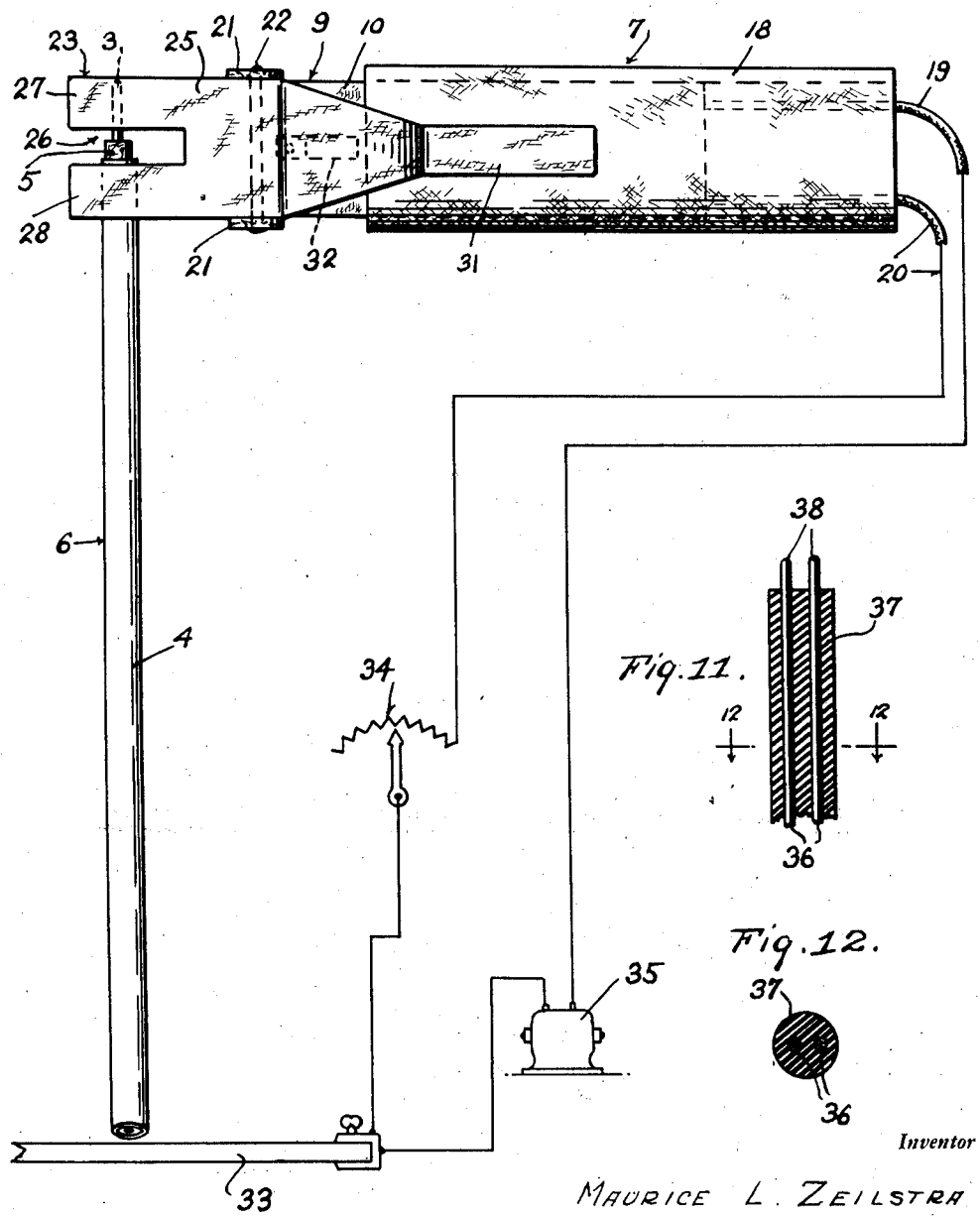

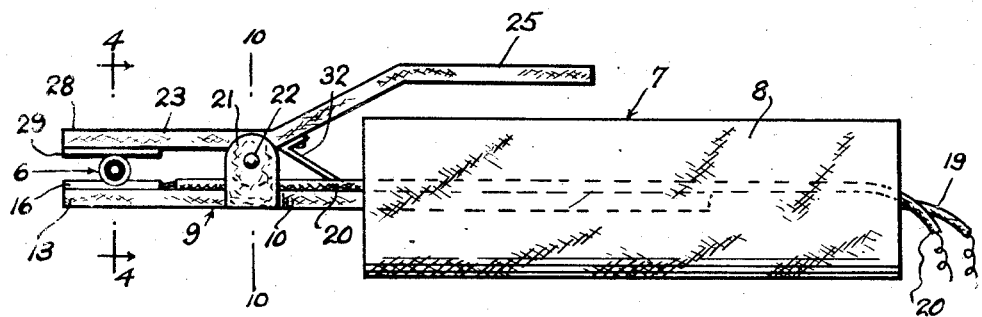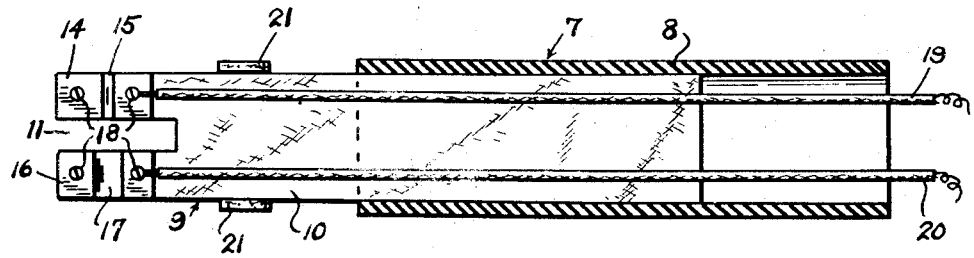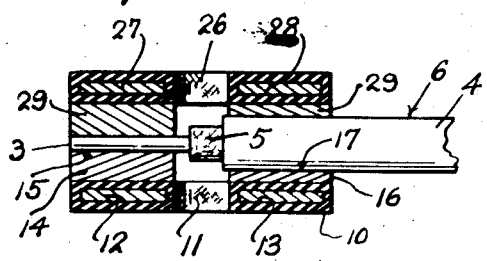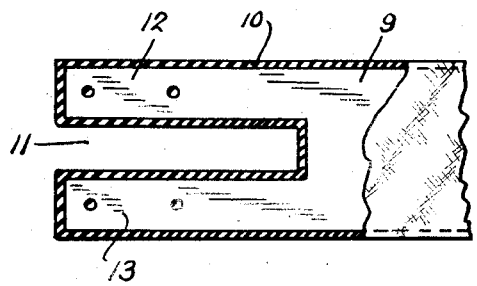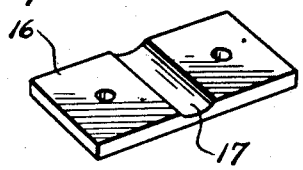

2,379,777

UNITED STATES PATENT OFFICE 2,379,777

WELDING ELECTRODE HOLDER

Maurice L. Zeilstra, Richmond, Calif.

Application October 12, 1943, Serial No. 505,978

2 Claims. (Cl. 219—8)

The present invention relates generally to new and useful improvements in arc welding apparatus, and has for its primary object to provide, in a manner as hereinafter set forth, a bipolar electrode holder of novel construction.

Other objects of the invention are to provide a bipolar welding electrode holder which will be comparatively simple in construction, highly efficient and reliable in use, and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a plan view of a holder and electrode constructed in accordance with the present invention, showing the electric system diagrammatically.

Figure 2 is a view in side elevation of the holder, showing an electrode therein.

Figure 3 is a view in horizontal section through the holder.

Figure 4 is a cross-sectional view, taken substantially on the line 4—4 of Figure 2.

Figure 5 is a view in horizontal section through a pair of the holder jaws.

Figure 6 is a detail view in perspective of one of the face contacts of the stationary jaws.

Figure 7 is a bottom plan view of the pivoted jaws, showing a portion of the lever broken away in section.

Figure 8 is a view in longitudinal section through the electrode.

Figure 9 is a diagrammatic view of the electric circuit.

Figure 10 is a cross-sectional view, taken substantially on the line 10—10 of Figure 2.

Figure 11 is a view in longitudinal section through an end portion of a modified electrode.

Figure 12 is a cross-sectional view, taken substantially on the line 12—12 of Figure 11.

Referring now to the drawings in detail, it will be seen that the electrode comprises a metallic inner conductor or rod 1 of the usual metal. An insulating flux 2 covers the inner conductor 1 with the exception of an end portion 3 thereof. The flux 2 insulates the inner conductor or rod 1 from an outer conductor 4 of a suitable metallic or carbonaceous material. One end portion of the flux 2, which is adjacent the exposed portion 3 of the inner conductor 1, projects beyond the corresponding end of the outer conductor 4, as at 5.

It will thus be seen that a bipolar electrode has been provided, which electrode is designated generally by reference character 6.

A holder 7 is provided for the electrode 6. In the embodiment shown, the holder 7 includes a tubular handle 8 of suitable insulating material. Fixed longitudinally in the tubular handle 8 and projecting from one end thereof is a resilient metallic bar 9 which is insulated, as at 10. The forward end portion of the bar 9 is bifurcated, as at 11, in a manner to provide stationary jaws 12 and 13.

The jaw 12 has mounted thereon a contact face 14 having a transverse groove or channel 15 therein for the reception of the exposed end portion 3 of the inner conductor 1. A contact face 16 is mounted on the jaw 13 and has formed transversely therein a comparatively large groove or channel 17 which is aligned with the groove 15 and which is for the reception of the outer conductor 4 of the electrode 6. Insulated positive and negative conductors 19 and 20, respectively, pass through the tubular handle 8 and are connected at one end to the contact faces 14 and 16. Screws 18 secure the contacts 14 and 16 in position and connect the conductors 19 and 20 thereto. Apertured ears 21 rise from the metallic bar 9 adjacent the forward end of the tubular handle 8.

Journaled on a pin 22 between the ears 21 is an angular bar 23 which is also of suitable resilient metal. Apertured ears 24 on the bar 23 accommodate the pin 22. Insulation 25 encloses the bar 23.

The forward end portion of the bar 23 is bifurcated, as at 26, to provide swinging jaws 27 and 28 which are cooperable, respectively, with the stationary jaws 12 and 13. The jaws 27 and 28 are provided with faces 29 of conducting material which are secured by screws 30.

Projecting rearwardly from the pivoted end of the plate 23 is an offset thumb lever 31 which parallels the tubular handle 8 in spaced relation thereto. Mounted beneath the forward portion of the lever 31 is a spring 32 which is engaged with the plate 9 for closing the jaws 27 and 28.

It is thought that the operation of the invention will be readily apparent from a consideration of the foregoing, particularly to those skilled in the art of arc welding. Briefly, the bipolar electrode 6 is mounted in the holder 7, the jaws 27 and 12 clamping the exposed end portion 3 of the inner conductor 1, the jaws 28 and 13 clamping therebetween the outer conductor 4. Thus, the elements 1 and 4 are electrically connected, respectively, to the conductors 19 and 20. The conductor 20 from the outer conductor 4 of the electrode is grounded to the work, as at 33, through a variable resistance 34. A conventional generator 35 supplies the welding current. Assuming that the circuit illustrated is maintained and an arc is struck on the work, the inner conductor 1 will arc to said work. However, the outer conductor 4, which is grounded to the work through the variable resistance 34, is also of opposite polarity with reference to the inner conductor 1 with the result that an arc will form therebetween. This arc will continue when the electrode is removed from the work. By regulating the resistance 34 and slightly increasing the arc between the electrode and the work, substantially all of the welding current may be utilized for melting said electrode.

The modification illustrated in Figures 11 and 12 of the drawings comprises a pair of spaced, parallel conductors 36 in an insulating flux 37. The conductors 36 include exposed end portions 38. The conductors 36 of this modified bipolar electrode may be connected in the circuit or system in any suitable manner.

It is believed that the many advantages of a bipolar welding electrode and holder therefor constructed in accordance with the present invention will be readily understood, and although preferred embodiments are as illustrated and described, it is to be understood that further modifications and changes in the details of construction may be resorted to which will fall within the scope of the invention as claimed.

What is claimed is:

1. A holder for a bipolar welding electrode, comprising a first elongated member having a handle on one end and a pair of contact-carrying jaws at the other end with its contacts insulated from each other, a second elongated member pivoted intermediate its ends to the intermediate portion of the first-named elongated member, said second elongated member having a thumb piece on one end disposed beside said handle and a pair of contact-carrying jaws on the other end with its contacts insulated from each other, one contact of the first member cooperating with one contact of the second member for gripping one conductor of the electrode, the other contact of the first member coacting with the other contact of the second member for gripping the other conductor of the electrode, and a spring acting on said second member to swing the latter in a direction to cause said contacts to grip said conductors.

2. A holder for a bipolar welding electrode, comprising a first elongated member having a handle on one end and a pair of contact-carrying jaws at the other end with its contacts insulated from each other, a second elongated member pivoted intermediate its ends to the intermediate portion of the first-named elongated member, said second elongated member having a thumb piece on one end disposed beside said handle and a pair of contact-carrying jaws on the other end with its contacts insulated from each other, one contact of the first member cooperating with one contact of the second member for gripping one conductor of the electrode, the other contact of the first member coacting with the other contact of the second member for gripping the other conductor of the electrode, and a spring acting on said second member to swing the latter in a direction to cause said contacts to grip said conductors, the first-named contacts of said members having mating narrow grooves to fit the first-named conductor, the second-named contacts of said members having wider mating grooves aligned with the narrow grooves and adapted to fit the second-named conductor.

MAURICE L. ZEILSTRA.